United States Patent
Hegge et al.

(10) Patent No.: US 9,009,779 B2
(45) Date of Patent: Apr. 14, 2015

(54) METHODS RELATED TO NETWORK ACCESS REDIRECTION AND CONTROL AND DEVICES AND SYSTEMS UTILIZING SUCH METHODS

(75) Inventors: James D. Hegge, Vancouver, WA (US); Bryan D. Ashby, Salt Lake City, UT (US); Hugh C. Davis, Salem, UT (US); William F. Phillips, West Jordan, UT (US)

(73) Assignee: Content Watch, Inc., Salt Lake City, UT (US)

( * ) Notice: Subject to any disclaimer, the term of this patent is extended or adjusted under 35 U.S.C. 154(b) by 13 days.

(21) Appl. No.: 13/296,040

(22) Filed: Nov. 14, 2011

(65) Prior Publication Data
US 2012/0124641 A1    May 17, 2012

Related U.S. Application Data

(63) Continuation of application No. 61/413,203, filed on Nov. 12, 2010.

(51) Int. Cl.
| | | |
|---|---|---|
| *G06F 21/00* | (2013.01) | |
| *H04L 29/06* | (2006.01) | |
| *G06F 11/00* | (2006.01) | |
| *G06F 21/55* | (2013.01) | |
| *H04L 29/08* | (2006.01) | |

(52) U.S. Cl.
CPC ............ *G06F 21/554* (2013.01); *H04L 63/306* (2013.01); *H04L 67/2804* (2013.01); *H04L 67/2814* (2013.01)

(58) Field of Classification Search
CPC ............ H04L 67/2814; H04L 67/2804; H04L 21/554; H04L 63/306
USPC .............................................. 726/1, 13, 24, 26
See application file for complete search history.

(56) References Cited

U.S. PATENT DOCUMENTS

| | | | | |
|---|---|---|---|---|
| 5,263,158 | A  * | 11/1993 | Janis ..................................... | 1/1 |
| 6,990,492 | B2 * | 1/2006  | Gupta ................................... | 1/1 |
| 7,089,586 | B2 * | 8/2006  | Kilgore .......................... | 726/13 |
| 7,864,788 | B2 * | 1/2011  | Paskett et al. ................. | 370/401 |
| 2007/0226788 | A1 * | 9/2007 | Lee ................................. | 726/11 |
| 2009/0325615 | A1 * | 12/2009 | McKay et al. ............... | 455/466 |
| 2010/0049974 | A1 * | 2/2010 | Winjum et al. ............... | 713/166 |

OTHER PUBLICATIONS

William Enck et al. (TaintDroid: An Information-Flow Tracking System for Realtime Privacy Monitoring on Smartphones, NAS-TR-0120-2010, Oct. 11, 2010).*
Rodrigo Zechin Rosauro (DroidWall r106, Nov. 16, 2010).*
Lockwood et al. (An Extensible, System-On-Programmable-Chip, Content-Aware Internet Firewall, Proceedings LNCS, Sep. 2003).*
"Netfilter." Wikipedia May 6, 2012, pp. 1-7.
"Iptables." Wikipedia Jun. 6, 2012, pp. 1-4.

* cited by examiner

*Primary Examiner* — Saleh Najjar
*Assistant Examiner* — Oleg Korsak
(74) *Attorney, Agent, or Firm* — Morriss O'Bryant Compagni

(57) ABSTRACT

In illustrative embodiments, methods in accordance with the present invention utilize a thin kernel module operating in the kernel space of an operating system to redirect all TCP flows to user space for application analysis and processing. Redirected data is presented to the user space application as a data stream, allowing the processing of information contained within the data stream from the user space on a mobile device. This allows the user space application to inspect and take action on incoming data before allowing the data to continue to pass through the device. This enables parental controls, firewalls, real-time anti-virus scanning, tethering/hot-spot, bandwidth optimization, and similar programs to effectively operate across different mobile devices as user downloadable/actuatable applications.

7 Claims, 3 Drawing Sheets

METHODS RELATED TO NETWORK ACCESS REDIRECTION AND CONTROL AND DEVICES AND SYSTEMS UTILIZING SUCH METHODS

CROSS-REFERENCE TO RELATED APPLICATION

This application claims the benefit of U.S. Provisional Application No. 61/413,203, filed Nov. 12, 2010, the disclosure of which is incorporated herein by reference in its entirety.

TECHNICAL FIELD

The present invention relates to the interception and processing of network traffic and more particularly to the interception and processing of network traffic in ways that are adapted for use with mobile devices that operate at least in part over cellular telephone networks.

BACKGROUND

Current desktop solutions for the interception of data forming network traffic include the use of layered service provider (LOP) and windows filtering protocol (WET) and device drivers on desktop computers running Windows operating systems, device drivers on computers running MAC OS and iptables and device drivers on computers running Linux OS. Each of these approaches allows for the interception and modification of inbound and outbound Internet traffic and processing of the TCP/IP traffic taking place between the Internet and the applications on the machine that are accessing the Internet. These approaches have allowed for filtering of the data stream for parental control, virus scanning, spam filtering, and firewall protection. However, the ability to perform similar interception and processing on a mobile device, such as a smart phone, has been quite limited due to the nature of the mobile devices and the carrier networks on which they operate.

On a typical mobile device, such as an iPhone™, Blackberry™, or a smart phone operating the Symbian™ or WindowsMobile™ 5x, 6x allowed device drivers, there is no technology present that allows for the interception of network traffic. Since the primary purpose of the device is to operate as a phone, the phone manufacturers and cellular carriers limit the ability of application developers to create applications that operate in the "user space" of the device within the operating system rather than in the "kernel space" or "machine space" that is typically required for traffic interception, as any potential conflicts at such a low level would lead to the device becoming completely inoperable, rather than just an inability to run a single application while still functioning for other purposes.

Similarly, although certain versions of the Android™ operating system include iptables, not all carriers have enabled iptables, and for those that have enabled this feature, access to iptables is locked down and requires administrator access and is thus unavailable for application designers for similar reasons. Additionally, iptables places all, of the intelligence and processing in the kernel modules and only redirects certain data flows into the user space.

Thus, it is not currently possible to perform network level filtering on a mobile device. Current attempts to filter network access on such devices are limited, as for example to direct filtering of loaded material in a web browser.

A technology or method that enables the interception and modification of inbound and outbound network traffic and processing of the traffic taking place between the network and applications on a mobile device that minimizes the risk of conflict in the kernel space would be an improvement in the art. Such an improvement that directed all data flows on the device into the user space for analysis and processing regardless of protocol would be a further improvement in the art.

SUMMARY

The present invention includes methods and processes for the interception and modification of inbound and outbound network traffic and processing of the traffic taking place between the network and applications on a mobile device and mobile devices that utilize such technology. In one illustrative embodiment, a method in accordance with the present invention utilizes a thin kernel module operating in the kernel space of an operating system to redirect all TCP flows to user space for application analysis and processing. Redirected data is presented to the user space application as a data stream, allowing the processing of information contained within the data stream from the user space on a mobile device. This allows the user space application to inspect and take action on incoming data before allowing the data to continue to pass through the device. This enables parental controls, firewalls, real-time anti-virus scanning, tethering/hot-spot, bandwidth optimization, and similar programs to effectively operate across different mobile devices as user downloadable/actuatable applications.

DESCRIPTION OF THE DRAWINGS

It will be appreciated by those of ordinary skill in the art that the various drawings are for illustrative purposes only. The nature of the present invention, as well as other embodiments of the present invention, may be more clearly understood by reference to the following detailed description of the invention, to the appended claims, and to the several drawings.

DETAILED DESCRIPTION

The present invention relates to systems and processes for the interception and modification of inbound and outbound network traffic and processing of the traffic taking place between the network and applications on a mobile device. It will be appreciated by those skilled in the art that the embodiments herein described, while illustrating certain embodiments, are not intended to so limit the invention or the scope of the appended claims. Those skilled in the art will also understand that various combinations or modifications of the embodiments presented herein can be made without departing from the scope of the invention. All such alternate embodiments are within the scope of the present invention.

In one illustrative embodiment, a set of processes in accordance with the principles of the present invention are referred to as NARC (Network Access Redirection & Control). NARC is a robust set of services with a well-defined API 104 that provides a common data stream interface for applications. NARC intercepts all incoming and outgoing network traffic on a device, rather than just web-related traffic, and redirects that traffic to one or more NARC-aware applications 106 that reside in the User Space of the device.

A NARC-aware application 106 can then inspect and take action on that data before allowing the data to continue passing through the device. NARC thus functions as an extensible engine that can be used by applications for parental controls (such as Net Nanny™), firewalls, tethering/hot-spot, real-time anti-virus scanning, bandwidth optimization, etc.

Figure 1:
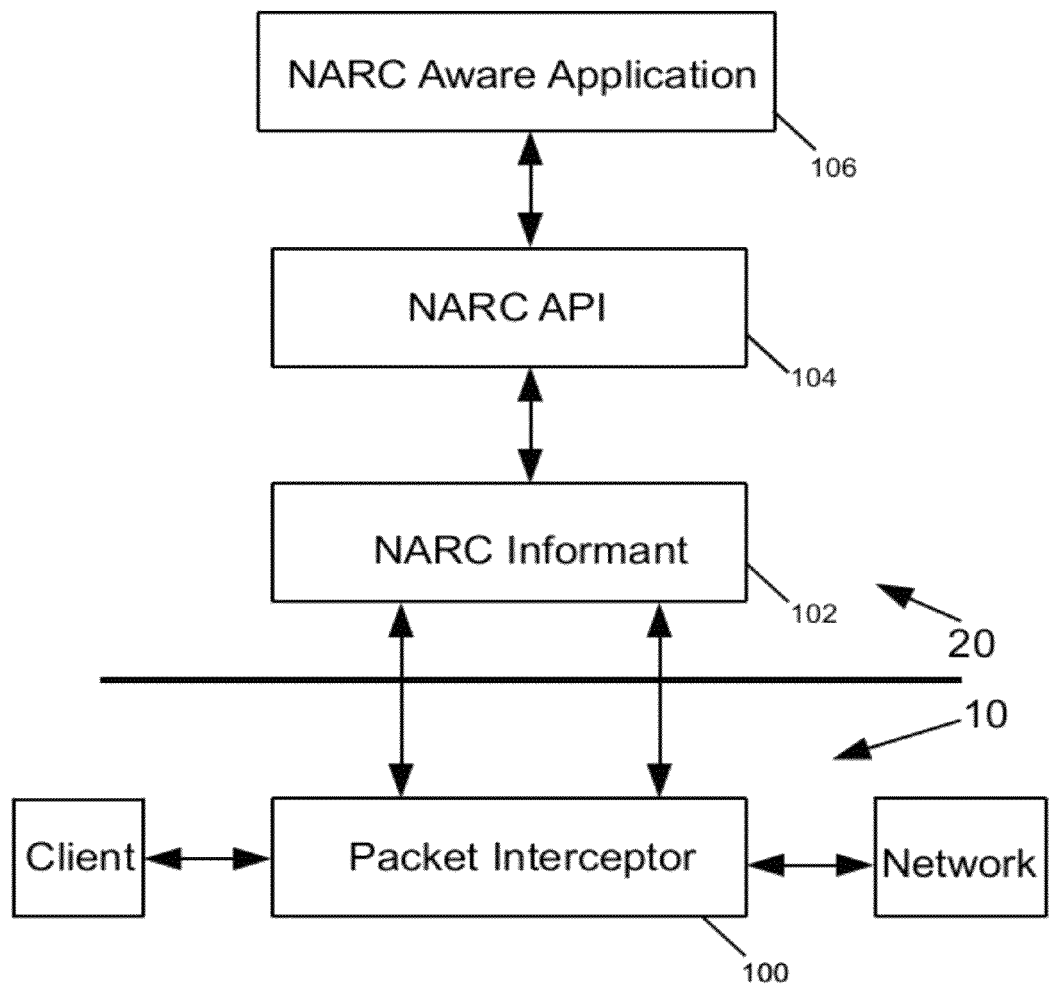
FIG. 1 is a graphic illustration of a system that operates in accordance with one aspect of the present invention.

The basic components of NARC are graphically illustrated in FIG. 1 and include the NARC Packet Interceptor 100, NARC Informant (NI) 102, and the NARC API 104, which interact with a NARC aware application 106. Currently, NARC has been implemented on mobile devices using the Android OS versions 1.6 and later, but it will also run on iPhone, Symbian, Windows Mobile, RIM, Apple OS/X and Linux as all such operating systems use BSD sockets which will allow the NARC Interceptor 100 to function as a kernel module. It will be appreciated that NARC may be used with other operating systems which allow for such functionality, and that in addition to smart phones, any mobile device using such an operating system may be used, including tablets, and more.

The NARC API 104 is abstracted from the Operating System (OS) by a small kernel module called the Packet interceptor 100. The Packet Interceptor 100 is loaded as a small kernel module (which may be as small as 20K in size for embodiments allowing for certificated multiple use or even 10K or less for embodiments not requiring such certificates) in the kernel space (generally indicated at 10) of the device's Operating System. This code remains dormant until needed. The kernel module can be updated over the air (OTA) and must be updated OTA whenever the firmware changes.

It will be appreciated that the NARC API 104 and interceptor 100 may utilize an abstraction layer, as known in the art, to be OS agnostic and allow for a single version to be utilized on multiple operating systems, or that individualized versions of the NARC API 104 and interceptor 100 may be used for particular applications, depending on the desired usage.

Data received or sent by the mobile device (for example, any request made using the TCP protocol) is intercepted by the packet interceptor 100 operating in the kernel space 10 and redirected to the NARC Informant 102 operating in the user space (generally indicated at 20). The reassembly of packets occurs in User Space 20, in the Informant Module 102. It also ensures that additional necessary information and metadata (such as destination address, etc.) are conveyed to the user space 20. Thus, unlike current solutions, the NARC preserves and conveys the additional necessary information associated with the data stream into the user space.

Upon redirection of the data, the NI 102 makes an API call to the NARC API 104, which determines whether to allow or block the data based on a NARC library of rules and the NARC aware programs 106. If allowed, the data is directed to the appropriate NARC aware program 106. For example, where the NARC aware program 106 is a parental control program, similar to the NET NANNY™ parental control program, the NARC-aware program 106 operates in the user space and directs the NI 102 to block the data where it contains material that is not allowed under the set parental controls. Similarly, if the NARC-aware program 106 is a real-time virus scanning program, it will direct the NI 102 to block the data where a threat is detected under the appropriate parameters.

In one illustrative embodiment, NARC uses a permissions-based system to ensure only those applications that have the proper Permission will be allowed to use the NARC API. Interaction between NARC and the Interceptor is secured via an encrypted access key that is not available outside of NARC. However it will be appreciated that in alternative embodiments, a non-permissions-based system may be used to allow additional applications on the device to use the NARC API.

Where a permissions based system is used, proprietary format certificates are provided to developers of NARC aware programs 106 for placement into the programs. In order to communicate with the NARC informant 104 each program must provide an appropriate certificate, presented through a secure access key. A network provider or the NARC API developer may act as a gatekeeper and determine with software developers and programs are allowed to use the NARC processes. It will be appreciated that these embodiments of the NARC API are unique in the art as certification is tied to the API 104 itself, so that authentication is happening at the root level rather than at the operating system level of a device.

It will be appreciated that NARC may function for all data sent or received by the device, regardless of whether the data is received via WiFi, a cellular network or some similar over-the-air methodology and that it allows screening of all such data, not just web browser data. This enables parental control solutions to operate in an environment that is browser-independent, thereby making them more secure and robust.

Other examples of uses for NARC with NARC-aware programs are numerous. For example, since current mobile devices have no network-level firewall support, the NARC can provide a heterogeneous firewall solution for all OSs or for third-party vendors. Additionally, since NARC provides additional provisioning and control, it would allow a cellular carrier, for example, to sell differentiated services in the market place. Where a mobile device is used to provide a mobile hotspot, in addition to providing the hotspot, the device would be able to inspect all hotspot traffic via stream-processing applications such as Net Nanny™.

One presently preferred multi-instance multi-use processes using the system of FIG. 1 allows multiple NARC aware applications to use the NARC API by individually accessing the API one at a time in such manner that each such application accesses information from the TPC stream as if it is the only application doing so. Since each application remains unaware of the others, including the NARC API, this allows them to simultaneously use the data. The partitioned configuration graphically illustrated in FIG. 2 and the flow table graphically illustrated in FIG. 3 depict how this process may proceed.

Incoming data packets on the device are converted into a TCP data stream which is offered to each instance of a NARC aware application. Where such an application chooses to receive the data stream, it follows a process similar to that explained in connection with FIG. 1, if the application chooses not to receive the data stream, then the NARC processes passes on to the next NARC aware application. At any time such an aware application can issue a "continue" or a "skip" command so as to access the NARC API as needed.

Figure 2:
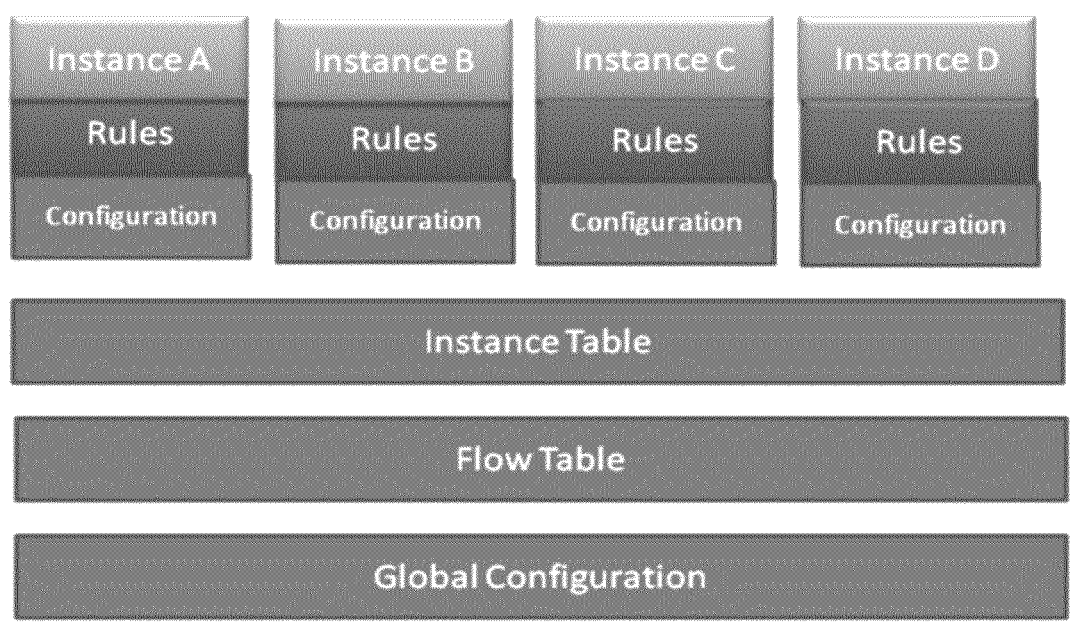
FIG. 2 is a graphic illustration of partitioned configuration for conducting a multiple instance multiple process procedure screening procedure which can operate on the system of FIG. 1.
Figure 3:
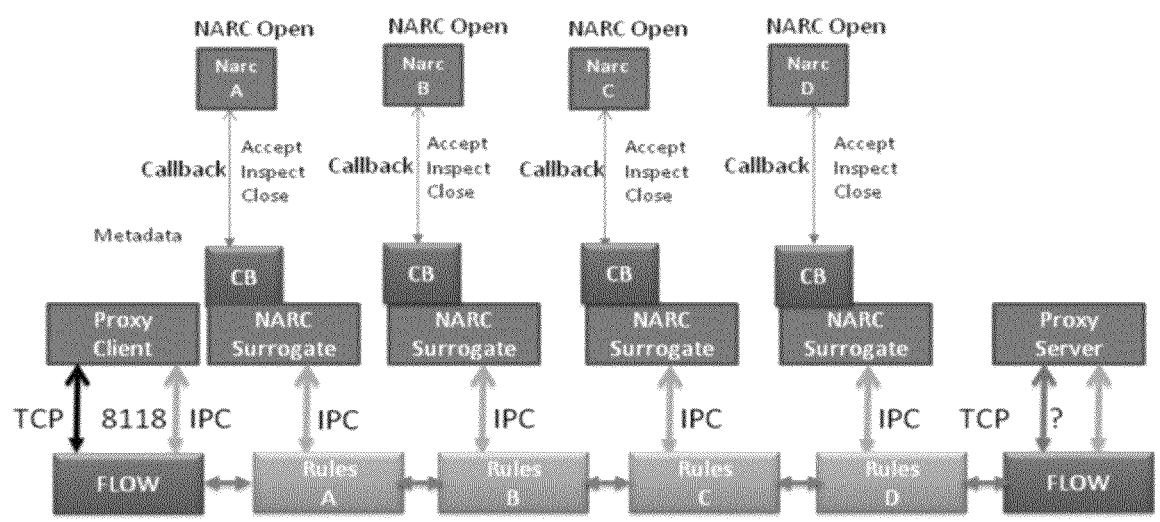
FIG. 3 is a graphic illustration flowchart for a multiple instance multiple process procedure operating on the partitioned configuration FIG. 2.

The use of NARC by multiple NARC aware programs is controlled by instance rules that are individually maintained for each individual instance as depicted in FIG. 2, with Instance A, Instance B, Instance C and Instance D. It will be appreciated that more or fewer instances may occur in a single installation and the use of A through D is used merely for illustration. It is noted that the use of individually maintained instance rules is unique, in contrast to known art such as iptables which use a global rule set for every process. The NARC Instance Manager allows each NARC aware application to access the data that it requires and "skip" other data from the data stream. For example, an email program running on the mobile device may only access email data while an internet filtering program may disregard email data while monitoring data loading through other ports.

Each instance or use of NARC by a NARC aware program is logically partitioned from the other instances by the informant (NI) 102 operating in the kernel space. The NI 102 manages the instances including authentication. Each instance thus functions as using a separated API.

Access to the NARC API requires a NARC Aware program to have a certificate recognized by the NARC API. Program developers will be able to obtain the certificate required either from the NARC developer or the provider of the network on which a mobile device operates, depending on the implementation. One aspect of the certification process is that each certificated NARC aware program allowed to access the NARC API includes a value associated with the certificate that gives it an elevation level in with respect to other NARC aware programs. The elevation level may be based on the application type.

As the multi-instance NARC process starts, each certificated program is giving a PID key and individual rule commands are added associated with the individual keys. Different levels of security may be used for inter-instance protection and the valid certificate and passing HMAC are required before the instance is assigned. For example a 20 byte HMAC authentication may be used as a handle, and may be rehashed to a smaller handle of 32 bits. All IPC messages may be authenticated using HMAC and a new dynamic authorization may be assigned for each IPC message.

The rules are accessed and the data flow examined for each program. As in the single implementation example, data received or sent by the mobile device (for example, any request made using the TCP protocol) is intercepted by the packet interceptor 100 operating in the kernel space 10 and redirected to the NARC informant 102 operating in the user space 20. The reassembly of packets occurs in User Space, in the Informant Module 102, ensuring that additional necessary information and metadata (such as destination address, etc.) are conveyed to the user space to preserve and convey the additional necessary information associated with the data stream into the user space.

Upon redirection of the data, the NI 102 makes a first API call following the set elevation levels (with A as the first or highest level) to the NARC API 104 for highest NARC API level (shown as Instance A in FIG. 2 and as NARC Surrogate for NARC A in FIG. 3). As depicted in FIG. 3, this first. NARC instance, NARC A, then determines whether to allow or block the data based on the NARC instance rules associated with that certificated NARC aware program, designated as RULES A in FIG. 3. If allowed, the data is directed to NARC program A. If not allowed, the data stream is closed with respect to that program.

The NI then makes a second API call to the next highest elevation level to the NARC API for that NARC API level, shown as Instance B in FIG. 2. As depicted in FIG. 3, NARC B then determines whether to allow or block the data based on the NARC instance rules (RULES B) associated with that certificated NARC aware program. If allowed, the data is directed to NARC program B. If not allowed, the data stream is closed with respect to that program. This process continues for the subsequent elevation levels in descending order for active NARC aware programs on the device, each of which separately accesses the associated NARC API as if inns the only program accessing the NARC Informant.

It will be appreciated that in some embodiments, the rules associated with a particular NARC aware program tray close the data stream with respect to NARC aware programs having a lower elevation. For example, where the program is a virus detection program that recognizes a virus in the data stream, the associated rules may close the data stream for all remaining programs. In such embodiments, the lower elevation programs may be unaware of the blocking at a higher elevation and may simply continue by skipping to an open data stream or an open portion of the data stream.

While there are many virus-scanning applications on the market today, none of them scan for viruses in real-time on mobile devices. Instead, these solutions perform periodic and/or on-demand scanning only. NARC enables third parties to access the data stream so that their application can carry out signature recognition to better control and protect the mobile device in real time. A real-time virus scanning program that is NARC aware would thus able to access the data stream with an appropriate elevation level. For example, such a program may include a high elevation level and instance rules that terminate a threatening data flow to programs with a lower elevation level to block such potentially damaging data from being accessed on the device.

NARC can be used as an alternative to Linux/Android iptables, without the overhead that it introduces, it also provides enhanced metadata support, beyond what iptables provides today. NARC coexists with iptables and will not affect any applications than use iptables for their implementation.

NARC has the ability to capture the native data stream of all network traffic. This allows the analysis and control of all protocols. NARC facilitates the abstraction of all metadata from the network stream accommodating the above-mentioned functionalities. A side-by-side comparison of NARC and iptables are presented in the following Table.

| NARC vs. iptables | | |
| --- | --- | --- |
| Requirement | IPTABLES | NARC Kernel Module |
| Android 1.6 (Donut) | No Support | Full Support |
| Android 2.1 (Eclair) | Limited Support | Full Support |
| Android 2.2 (Froyo) | Full Support | Full Support |
| Android 3.0 (Gingerbread) | Full Support | Full Support |
| Non Android OS | No Support | Full Support |
| Intended Use | Gateway (Squid) | Mobile Device |
| Disk Footprint | Large | Small <10K |
| Memory Footprint | Large (Kernel) | Small <100K (User Space) |
| Flow Count | Millions | 256-1024 |
| Flow Record | Complex | Simple |
| Security Foot Print | Huge-well known code | Small Security by obscurity |
| Proxy Support | DNAT - certain protocols | DNAT - all protocols |
| Metadata Support | None | Enhanced (Dest IP, Dest Port, PID, etc) |
| Proxy Architecture | Proxy certain flows | Proxy all flows (HTTP can be on any port) |
| Control | Requires root | BSD Socket Protocol (no root) |
| Enhanced Socket IO | None | Full Support |
| Enhanced Socket Security | None | Full Support |
| Code Location | Mostly kernel space | Mostly user space |

Including the packet interceptor as a kernel module in the OS of a mobile device allows a cellular carrier to use the system for screening data in order to determine how the device is used to set appropriate pricing for data services. For example by identifying whether email accounts accessed by the device are MS Exchange server based accounts, which are typically business accounts, or are web based accounts, such a Gmail, Hotmail, or the like, which are typically personal or non-business accounts, using a NARC-aware application that transmits such information to the carrier.

Additionally, by placing the processing of the data stream in the user space, the user has additional control over any data screening. For example, in some embodiments, if a device lacks any NARC aware applications, the packet interceptor remains dormant and the device functions normally. Only upon the installation and activation of a NARC-aware application, such as a parental control or virus scanning program, does the packet interceptor beginning to redirect data.

It will be appreciated that in addition to implementation on smart phones and mobile tablets, the NARC technology may be implemented in conventional desktop computing environments and in other places.

While this invention has been described in certain embodiments, the present invention can be further modified with the spirit and scope of this disclosure. This application is therefore Intended to cover any variations, uses, or adaptations of the invention using its general principles. Further, this application is intended to cover such departures from the present disclosure as come within known or customary practices in the art to which this invention pertains and which fall within the limits of the appended claims.

What is claimed is:

1. A process for screening data on a device comprising,
   intercepting all data sent or received by the device with a packet interceptor operating in a kernel space of the device operating system;
   redirecting the intercepted data stream with associated metadata to an informant program operating in a user space of the device operating system;
   determining whether to allow or block the data based on an API call made by the informant program to a protocol API which presents the intercepted data stream to a protocol aware program;
   inspecting the data with the protocol aware program and taking action on the data in accordance with a set of rules maintained by the protocol aware program in the user space by either blocking the data or directing the data to the protocol aware program.

2. The process of claim 1, wherein intercepting and redirecting data comprises assembling individual data packets into a coherent data stream.

3. The process of claim 2, wherein intercepting and redirecting data comprises intercepting and redirecting all TCP data received by the device.

4. The process of claim 2, wherein the protocol aware program is one of a number of protocol aware programs having authenticated access to the informant program through a permission based process using an encrypted access key.

5. The process of claim 4, wherein the packet interceptor recognizes the encrypted access key associated with a protocol aware program to allow interaction between the protocol aware program and the informant program.

6. The process of claim 1, wherein the device is a mobile device.

7. The process of claim 1, wherein the protocol aware program is a virus scanning program, an email program, or a parental control program.

* * * * *